United States Patent [19]
Rao et al.

[11] Patent Number: 5,116,695
[45] Date of Patent: May 26, 1992

[54] DEFERRED ACTUATED BATTERY ASSEMBLY SYSTEM

[75] Inventors: Bhaskara M. L. Rao, Flemington; Robert P. Hamlen, Bernardsville, both of N.J.

[73] Assignee: Alupower, Inc., Warren, N.J.

[21] Appl. No.: 520,642

[22] Filed: May 8, 1990

[51] Int. Cl.⁵ ............................................. H01M 6/48
[52] U.S. Cl. .................................... 429/12; 429/15; 429/18; 429/27; 429/118
[58] Field of Search ................ 429/12, 15, 18, 118, 429/27

[56] References Cited

U.S. PATENT DOCUMENTS

| | | | |
|---|---|---|---|
| 3,791,871 | 2/1974 | Rowley | 429/118 |
| 4,001,043 | 1/1977 | Momyer | 429/206 |
| 4,218,520 | 8/1980 | Zaromb | 429/27 |
| 4,714,240 | 3/1989 | Zaromb | 429/15 |
| 4,910,104 | 3/1990 | Rao et al. | 429/118 |

Primary Examiner—Brian E. Hearn
Assistant Examiner—Maria Nuzzolillo
Attorney, Agent, or Firm—Louis E. Marn

[57] ABSTRACT

The present invention relates to a deferred actuated battery assembly system comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for the flow of hydroxide-based alkaline electrolyte solutions selected from the group consisting of potassium hydroxide, sodium hydroxide and mixtures thereof.

3 Claims, 2 Drawing Sheets

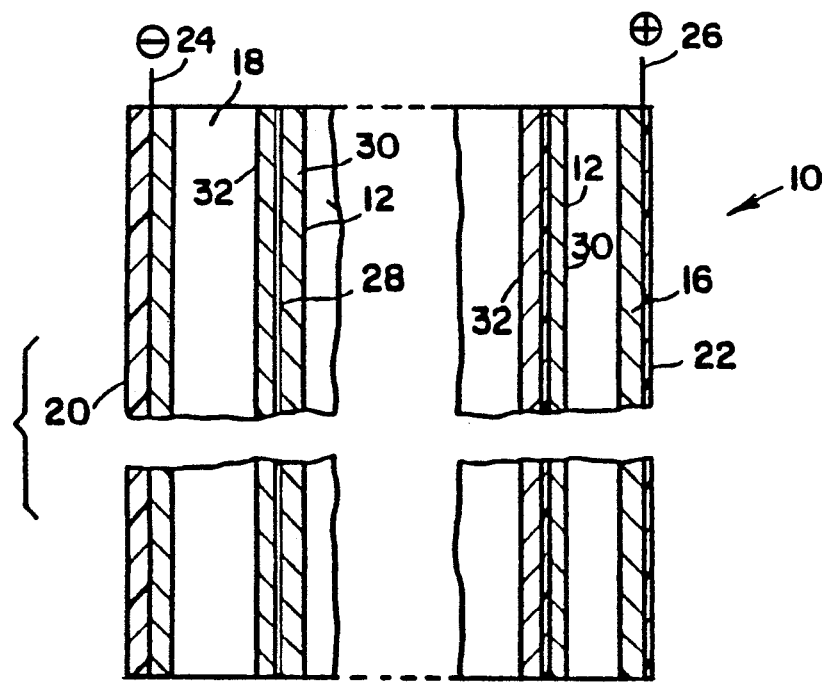
FIG.3
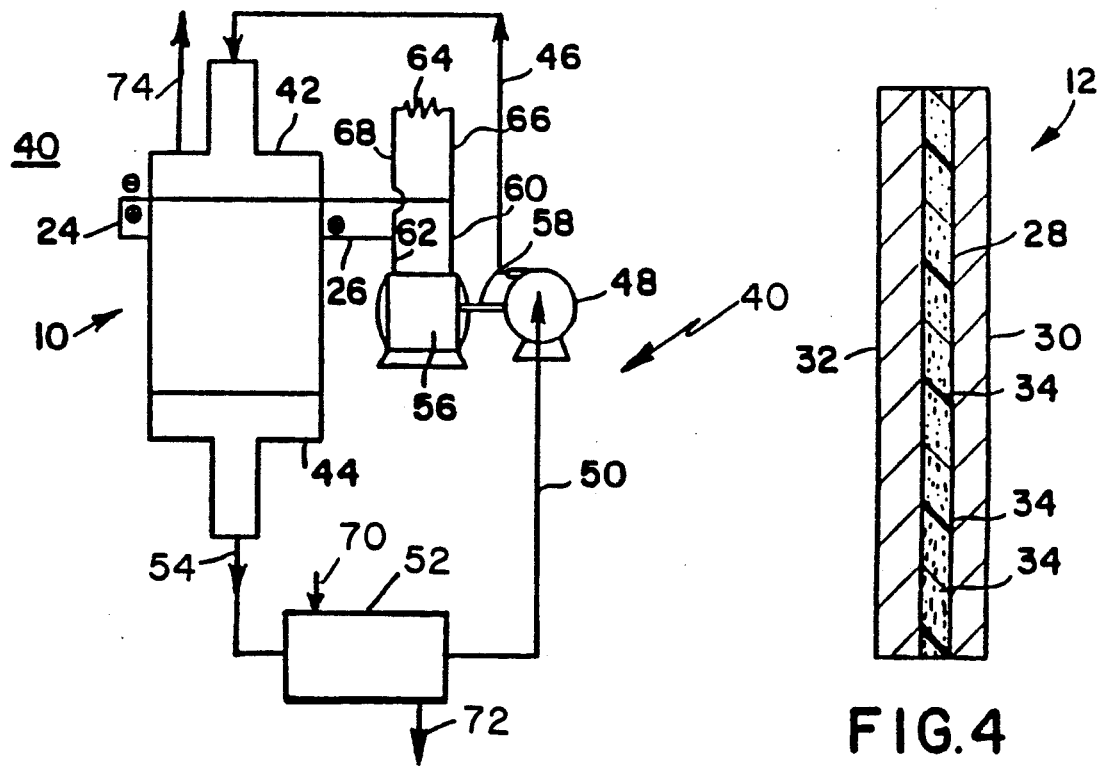
FIG.5
FIG.4

DEFERRED ACTUATED BATTERY ASSEMBLY SYSTEM

BACKGROUND OF THE INVENTION (1) Field of the Invention

This invention relates to deferred actuated batteries, and more particularly to an improved deferred actuated battery assembly system using a hydroxide-based alkaline electrolyte.

(2) Description of the Prior Art

Battery requirements for marine data systems vary from a few milliwatts for CMOS instrumentation to several tens of kilowatts for the operation of a mini autonomous underwater vehicle (AUY). Nonaqueous lithium cells and zinc-based primary cells, as well as nickel-cadmium and lead-acid batteries, are currently used. Safety and the corrosive nature of the electrolyte and/or some cathode materials used in such power sources dictate that cells and batteries be well sealed to prevent leakage and/or rupture during storage and use. Lithium batteries use hermetic seals with safety vents and a fuse. Alkaline cells are rendered leakproof by suitable double crimp joints. Lead-acid cells use a gelled electrolyte to prevent spillage of the electrolyte. Such techniques have minimized the hazards of handling and use, however at the expense of costs. Sealed cells require a "pressure hull" enclosure for deep sea application and thus use of a pressure hull significantly reduces energy density and concomitantly increases usage cost. Other types of power cells used in undersea applications are water activated magnesium batteries with a bipolar configuration as open cells. A magnesium anode and a metal halide-based cathode allows the use of seawater as the electrolyte and do not require a pressure hull housing for deep sea applications.

Deferred actuated batteries, such as silver chloride-magnesium batteries using seawater as an electrolyte have been used for years, and are expensive being based upon the use of a precious metal, i.e. silver. Subsequent developments centered on non-silver containing seawater actuated batteries, e.g. U.S. Pat. Nos. 3,432,350 and 3,462,309 to Wilson based upon a magnesium anode-inert metal cathode type of a serial flow type configuration provided limited usages as well as extensive electrical circuitry including tunnel diode inverters to provide useful voltage levels. In U.S. Pat. No. 4,185,143 to Brit et al., there is disclosed a water actuated battery based upon metal/organo halogen couples having anode and cathode members of planar form with a porous insulating member sandwiched therebetween where the cell is provided with electrolyte access passageways extending around the periphery of the cathode member whereby electrolyte flowing in the passageway access the whole peripheral edge region of the cathode reactant material.

In U.S. Pat. No. 4,910,104 to Rao et al. and assigned to the same assignee, there is disclosed a deferred actuated battery assembly comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for seawater based electrolyte flow.

In U.S. Pat. No. 4,910,102 to Rao, and assigned to the same assignee as the present invention, there is disclosed a deferred actuated battery assembly driven by a hydrogen peroxide containing electrolyte. While effective, the power density of such system were limited by the capacity and/or weight of the hydrogen peroxide required to be stored in the battery assembly.

OBJECTS OF THE PRESENT INVENTION

An object of the present invention is to provide an improved deferred actuated battery assembly system of improved power density.

Another object of the present invention is to provide an improved deferred actuated battery assembly system of improved power density and of longer operating life.

Still another object of the present invention is to provide an improved deferred actuated battery assembly system capable of generating hydrogen useful as a by-product.

SUMMARY OF THE INVENTION

These and other objects of the present invention are achieved by a deferred actuated battery assembly system comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for the flow of hydroxide-based alkaline electrolyte solutions selected from the group consisting of potassium hydroxide, sodium hydroxide and mixtures thereof.

BRIEF DESCRIPTION OF THE DRAWINGS

Further objects and advantages of the present invention will become apparent from the following detailed description when taken with the accompanying drawing, wherein:

FIG. 3 is an enlarged partial cross-sectional view of the battery assembly of FIG. 1;

FIG. 4 is a still further enlarged cross-sectional view of a bipolar electrode; and FIG. 5 is a schematic flow diagram of the battery assembly system of the present invention.

DETAILED DESCRIPTION OF THE INVENTION

Figure 1:
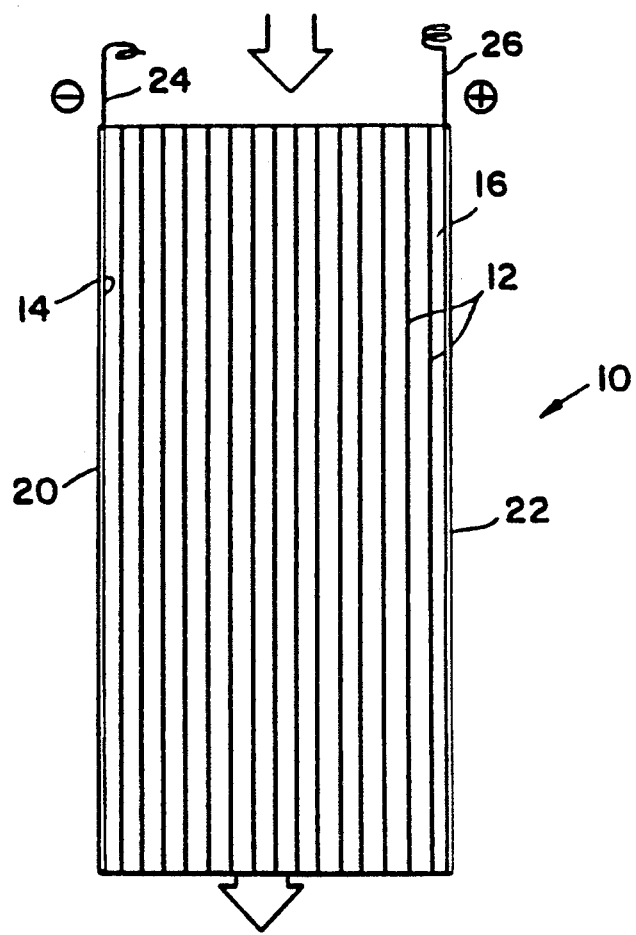
FIG. 1 is a cross-sectional view of a battery assembly for use in the present invention.
Figure 2:
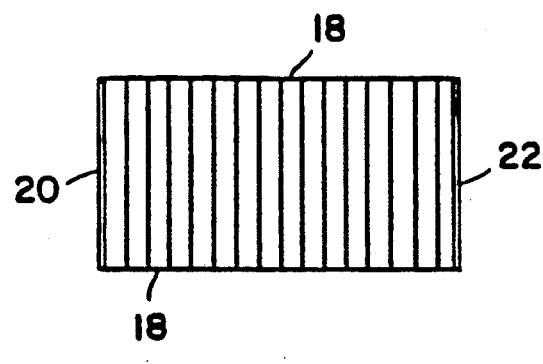
FIG. 2 is a top view of the battery assembly of FIG. 1.

Referring now to the drawings and particularly FIGS. 1 to 3, there is illustrated a battery assembly, generally indicated as 10, comprised of a plurality of bipolar electrodes 12 disposed between an anode plate 14 and an inert cathode current collector plate 16 and held in parallelledly-disposed spaced-apart relationship by side walls 18 formed of a dielectric material, such as any conventional plastic material suitable for battery usage. Generally, spacing between adjacent bipolar electrodes 12 in accordance with the present invention is initially not less than about 0.001 nor greater than about 2 inches to provide an adequate internally-connected series configuration. There being no top and bottom wall member, the battery assembly 10 permits the introduction as well as flow—through of the alkaline electrolyte from top to bottom, or alternately from bottom-to-top, etc. through the spaces between the component parts thereof, as more fully hereinafter described. The anode and cathode plates 14 and 16 are coated on an outer surface thereof with a dielectric material such as that of the side walls 18 forming anode end wall 20 and cathode end wall 22. The anode plate 14 and cathode plate 16 are provided with connector elements 20 and 22 for connection to a suitable user article or assembly, such as a light, motor, or the like.

As disclosed in U.S. Pat. No. 4,892,797, each bipolar electrode 12, referring specifically to FIG. 4, is comprised of electrically conductive laminating film or layer 28 laminated between an electronegative sheet or film of material 30 and an electropositive sheet or film of material 32. The electrically conductive laminating film or layer 12 is formed of a suitable plastic material, such as butyl or acrylic films of less than about 5 mils thickness. The butyl or acrylic film or layer 28 is formed with a dispersion of electrically conductive particles 34 in an amount sufficient to provide a volume resistivity of less than about 0.5 ohm cm. Such electrically conductive particles are exemplified by silver coated nickel particles of a particle size distribution of from 0.1 to 25 μm.

The anode plate 14 as well as the electronegative sheet or film 30 are formed of an aqueous stable material selected from the group consisting of aluminum, magnesium, aluminum alloys, magnesium alloys and mixtures thereof. The dimension including thickness of the anode plate 14 and the electronegative film or layer of the bipolar electrodes 12 are a function of capacity, e.g. 2 mil foil providing for low capacity (AH/sq. in) electrodes or a thickness approaching one inch for high capacity.

The cathode current collector plate 16 and electropositive current collector sheet or film 32 are formed of an inert conducting substrate, such as nickel, carbon, silver, lead and the like having a coating of a catalyst, such as palladium, platinum-palladium, iron or other low hydrogen overvoltage metal for effective operation as a hydrogen electrode, i.e. water-hydrogen. The cathode current collector plate 16 and electropositive current collector film or sheet 32 may be of a thickness of from 0.5 to 5 mils. It is to be noted that the cathode current collector plate 16 or foil 32 is inert to be distinguished from the metal salt cathodes as used in the heretofore seawater actuated batteries, as disclosed in the aforementioned U.S. Pat. No. 4,007,316 to Koontz.

In operation, the alkaline electrolyte, as more fully hereinafter described (not shown) is passed through the spaces between the bipolar electrodes 12, anode 14 and cathode 16 of the battery 10. The following equations represent the electrochemical reactions:

$$Al^\circ \rightarrow Al^{+3} + 3e^-$$

$$2H_2O + 2e^- \rightarrow 2(OH)^- + H_2$$

$$2Al^\circ + 6H_2O \rightarrow 2Al(OH)_3 + 3H_2$$

The hydroxide-based alkaline electrolytes contemplated by the present invention include solutions of from 0.5 up to about 60 weight percent selected from the group consisting of sodium hydroxide, potassium hydroxide and mixtures thereof.

Power density of the battery 10 of the present invention may be increased by: (i) decreasing the anode-cathode gap (reduces IR loss), and (ii) using improved catalysts in the cathode plate or film (i.e. to reduce the hydrogen overpotential). Cell voltage may be increased by increasing the number of bipolar electrodes in the cell stack as known to one skilled in the art. Additionally, overall current from a battery 10 may be increased by increasing the area of the electrodes and thus the battery of the present invention is amenable to simple scaling to desired or preselect performance levels or requirements.

In a preferred embodiment of the present invention, there is contemplated a deferred actuated battery assembly, i.e. capable of activation by the introduction of the hydroxide-based alkaline electrolyte, into the spaces of the battery 10 in a battery system providing for a flow of hydroxide-based alkaline electrolyte, such as by force circulation, referring now to FIG. 5.

In FIG. 5, there is illustrated an integral battery assembly system, generally indicated as 40, including the battery assembly 10, a fluid distribution manifold assembly 42 and a fluid collection manifold assembly 44 providing for hydroxide-based alkaline electrolyte fluid flow through the spaces of the battery 10. The distribution manifold assembly 42 is in fluid flow communication via line 46 with a pump 48 connected on a suction side by line 50 with a source of the hydroxide-based alkaline electrolyte from a storage or surge tank 52. The collection manifold assembly 44 provide for uniform flow through the spaces defined by the bipolar electrodes and the respective anode and cathode plates 14 and 16 for collection and discharge of the electrolyte via line 54 for return to the storage or surge tank 52. The anode and cathode plates 14 and 16, of the battery 10 are connected by conductors 24 and 26 to a motor 56 including a shaft 58 via conductors 60 and 62 for driving the pump 48 and to a load 64 via lines 66 and 68, respectively.

Thus, the integral battery assembly 40 of FIG. 5 may be integrally packaged for subsequent use and activation by the addition of the hydroxide-based alkaline electrolyte into the storage tank 52, the battery assembly 10 and accompanying fluid lines 46 and 50 by pump 48 as well as the related conduits. In this context, operation of the pump 48 may be continuous or intermittent as a function of electric usage requirements. Fresh hydroxide-based alkaline electrolyte is introduced by line 70 into the storage tank 52 with a waste electrolyte stream withdrawn by line 72. Gaseous hydrogen, as a by-product may be withdrawn by line 74 from the manifold 42 of the battery 10 for passage to other processing operations (not shown).

A battery assembly system of the present invention based on a 0.5 percent by weight potassium hydroxide solution exhibits a conductivity 0.02 ohm $-$ 1 cm $-$ 1 and is comparable to the conductivity of 1.5 percent by weight sodium chloride solution at 20° C. whereas a 40 percent by weight potassium hydroxide solution exhibits a conductivity of 0.52 ohm $-$ 1 cm $-$ 1 at $-35°$ C. A battery assembly system based on the use of alkaline electrolyte of the present invention permits operation within the range of from $-61°$ to 98° C. Additionally, the use of the alkaline electrolyte in the battery assembly system of the present invention permits the development of power densities approaching 1.5 to 2 KW/sq. meter for narrow gaped cells compared with power densities of from 25 to 30 W/sq. meter based on seawater as the electrolyte.

Advantages of the battery assembly system of the present invention include:
1. Elimination of cathode salts;
2. A service life of a function of an amount of anodic material;

3. The absence of a cathode active material permits increased shelf life particularly under high humidity storage conditions;
4. No self-discharge or deterioration of cell performance resulting from the solubility of a cathode salt; and
5. No increased weight, volume or cost associated with the use of cathode salt since the cathode plate is an inert current collector.
6. Reduced gross weight as a function of power density compared with defined actuated battery assemblies based, e.g. on hydrogen peroxide, etc.

The battery of the present invention is well suited for a variety of civilian (off-shore technology, commercial and recreational boating and fishing) and military marine applications, particularly for the electrical propulsion of underwater vehicles.

While the present invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. A battery assembly system, which comprises:
   a battery assembly comprised of an anode plate formed of a material selected from the group consisting of aluminum, magnesium, aluminum alloys, magnesium alloys and mixtures thereof; an inert cathode current collector plate functioning as a hydrogen electrode and a plurality of space-apart bipolar electrodes disposed between and spaced-apart from said anode plate and said inert cathode plates, each of said bipolar electrodes including an anode layer formed of a material selected from aluminum, magnesium, aluminum alloys, magnesium alloys and mixtures thereof and an inert cathode current collector layer functioning as a hydrogen electrode and laminated to said anode layer;
   storage means for a hydroxide-based alkaline electrolyte solution selected from the group consisting of potassium hydroxide, sodium hydroxide and mixtures thereof; and
   means for introducing said hydroxide-based alkaline electrolyte into said battery assembly.

2. The battery assembly system as defined in claim 1 wherein gaseous hydrogen is withdrawn as a by-product from said battery assembly.

3. The battery assembly system as defined in claim 1 and further including means for recirculating said hydroxide-based alkaline between said storage tank and said battery assembly.

* * * * *